(12) United States Patent
Renner et al.

(10) Patent No.: US 10,500,895 B2
(45) Date of Patent: Dec. 10, 2019

(54) WHEEL MADE OUT OF A FIBER REINFORCED PLASTIC MATERIAL

(71) Applicant: Mubea Carbo Tech GmbH, Salzburg (AT)

(72) Inventors: Christoph Renner, Gosau (AT); Karl Wagner, Salzburg (AT); Georg Ruzicka, Gmünd (AT)

(73) Assignee: MUBEA CARBO TECH GMBH, Salzburg (AT)

( * ) Notice: Subject to any disclaimer, the term of this patent is extended or adjusted under 35 U.S.C. 154(b) by 417 days.

(21) Appl. No.: 14/910,621

(22) PCT Filed: Jul. 10, 2014

(86) PCT No.: PCT/EP2014/064781
§ 371 (c)(1),
(2) Date: Feb. 5, 2016

(87) PCT Pub. No.: WO2015/018593
PCT Pub. Date: Feb. 12, 2015

(65) Prior Publication Data
US 2016/0193869 A1    Jul. 7, 2016

(30) Foreign Application Priority Data

Aug. 5, 2013    (CH) .................................. 01348/13

(51) Int. Cl.
*B60B 5/02*    (2006.01)
*B60B 3/10*    (2006.01)
(Continued)

(52) U.S. Cl.
CPC ................ *B60B 5/02* (2013.01); *B29C 65/02* (2013.01); *B29C 65/56* (2013.01); *B29C 65/567* (2013.01);
(Continued)

(58) Field of Classification Search
CPC .... B60B 5/02; B60B 3/00; B60B 3/02; B60B 3/10; B60B 3/12; B29L 2031/32; B29L 2031/322
See application file for complete search history.

(56) References Cited

U.S. PATENT DOCUMENTS 3,917,352 A    11/1975    Gageby
4,173,992 A *  11/1979    Lejeune ................... B60B 5/02
                                                     152/381.3
(Continued)

FOREIGN PATENT DOCUMENTS

CN       103764407 A        4/2014
DE   10 2005 041 940 A1     3/2007
(Continued)

OTHER PUBLICATIONS

Japanese Patent Office (JPO), Final Rejection for Japanese Patent Application 2016-533283, dispatched Dec. 4, 2018 (2 pages)—English only.
(Continued)

*Primary Examiner* — Jason R Bellinger
(74) *Attorney, Agent, or Firm* — Pauley Erickson & Kottis (57) ABSTRACT

A wheel includes a rim and a wheel center with several spokes with at least one butt strap. The at least one butt strap protrudes from a radially outer end of the spokes. The rim includes at least one opening arranged corresponding to the at least one butt strap. The at least one butt strap extends across the related opening in the rim and is attached to the outside of the rim.

21 Claims, 7 Drawing Sheets

(51) Int. Cl.
  *B60B 1/14* (2006.01)
  *B60B 5/00* (2006.01)
  *B29C 65/56* (2006.01)
  *B29C 65/00* (2006.01)
  *B29C 65/02* (2006.01)
  *B29L 31/32* (2006.01)

(52) U.S. Cl.
  CPC ............ *B29C 66/54* (2013.01); *B29C 66/721* (2013.01); *B29C 66/73941* (2013.01); *B60B 1/14* (2013.01); *B60B 3/10* (2013.01); *B60B 5/00* (2013.01); *B29C 66/7212* (2013.01); *B29C 66/72141* (2013.01); *B29C 66/73753* (2013.01); *B29L 2031/32* (2013.01); *B29L 2031/322* (2013.01); *B60B 2310/30* (2013.01); *B60B 2310/312* (2013.01); *B60B 2310/314* (2013.01); *B60B 2320/10* (2013.01); *B60B 2360/341* (2013.01); *B60B 2360/3416* (2013.01); *B60B 2900/111* (2013.01); *B60B 2900/311* (2013.01)

(56) References Cited

U.S. PATENT DOCUMENTS

| | | | | |
|---|---|---|---|---|
| 5,277,479 | A | * | 1/1994 | Koyama ................. B60B 5/02 301/6.91 |
| 2005/0121970 | A1 | | 6/2005 | Adrian |
| 2013/0026816 | A1 | | 1/2013 | Kia et al. |
| 2013/0049443 | A1 | | 2/2013 | Heß et al. |
| 2016/0200138 | A1 | | 7/2016 | Wagner et al. |

FOREIGN PATENT DOCUMENTS

| | | |
|---|---|---|
| DE | 10 2010 010 513 A1 | 9/2011 |
| DE | 10 2011 077 834 A1 | 12/2012 |
| DE | 10 2011 087 936 B3 | 2/2013 |
| DE | 10 2011 087 938 A1 | 6/2013 |
| EP | 0 282 008 A2 | 9/1988 |
| EP | 0 916 520 B1 | 3/2004 |
| EP | 2 412 543 A1 | 2/2012 |
| EP | 2 567 830 A2 | 3/2013 |
| GB | 1 372 357 A | 10/1974 |
| JP | S59-184001 A | 10/1984 |
| JP | 2-128958 A | 5/1990 |
| JP | H06-8701 A | 1/1994 |
| JP | H11-208202 A | 8/1999 |
| WO | WO 03/061933 A1 | 7/2003 |
| WO | WO 2011/000070 A1 | 1/2011 |
| WO | WO 2013/000009 A1 | 1/2013 |
| WO | WO 2013/083123 A1 | 6/2013 |
| WO | WO 2013/083500 A1 | 6/2013 |
| WO | WO 2013/083729 A2 | 6/2013 |

OTHER PUBLICATIONS

Japanese Patent Office (JPO), Japanese Notice of Reasons for Rejection for Japanese Patent Application 2016-533283, dispatched Apr. 3, 2016 (5 pages)—English only.

* cited by examiner

WHEEL MADE OUT OF A FIBER REINFORCED PLASTIC MATERIAL

BACKGROUND OF THE INVENTION

Field of the Invention

The present invention is directed to a wheel made out of a fiber reinforced plastic material.

Discussion of Related Art

DE102011087936B3 was published in February 2013 in the name of Thyssen Krupp Carbon Components GmbH. It describes a wheel made out of a fiber reinforced plastic and a method for producing such type of wheel. According to the document, a wheel is characterized by layers of reinforcing fibers which extend from the rim well over the outer rim bead (flange) to wheel disk without interruption. The wheel disk fades to the outer rim bead. The process to manufacture such a wheel comprises the lay-up of reinforcing fibers on forming tools, which are essentially cylindrically shaped. In order to build the wheel disk, reinforcing fibers are laid on the contour surfaces of essentially cylindrically shaped auxiliary forming tools. The auxiliary tools then are removed and the laid fibers are folded into a plane, which is perpendicular to the rotation axis of the wheel to build.

DE102011077834A1 was published in December 2012 in the name of Bayerische Motoren Werke AG. It describes amongst others a method for producing a wheels made out of a fiber reinforced plastic. Therefore, an injection molding or a transfer molding process using a fiber reinforced plastic is applied. The wheel is structurally reinforced (augmented) by the insertion of bands consisting of long fibers into the spokes as well as the rim.

DE102010010513A1 was published in September 2011 in the name of Leichtbau-Zentrum Sachsen GmbH. It describes among others a method for producing of a wheel with a rim made out of a fiber reinforced plastic. The connection between the wheel disk and the rim is established by peripheral braiding of a preformed wheel disk.

DE102005041940B4 was published in March 2007 in the name of Thyssen Krupp Carbon Components GmbH. It describes a wheel made out of a fiber reinforced plastic as well as a method for producing such a wheel. A wheel according to the invention comprises an auxiliary tool which at least partially defines the geometry of the resulting wheel. This auxiliary tool is wrapped by a braided hose, which is inserted into a central bore at the rotation axis of the resulting wheel, expanded and subsequently inverted.

WO13083123 was published in June 2013 in the name of ThyssenKrupp Carbon Components GmbH and shows a wheel with a rim made of fiber reinforced material. The document discloses a connection between wheel disk and rim by connecting at least two partial layers of the wheel disk to the rim by laying contoured joining zones of the partial layers alongside the centripetal contour of the rim. As well, the document discloses methods to produce said wheel.

WO13083500 was published in June 2013 in the name of ThyssenKrupp Carbon Components GmbH and shows a wheel with a wheel spider. The spokes of the wheel spider are made of a fiber reinforced material and comprise linear textile strands that extend at least once without interruption from the rim to the wheel's hub and back. The ends of the textile strands are laid alongside to the centripetal contour of the rim. As well, the document discloses methods to produce said wheel.

Problems of existing wheel concepts may result from an insufficient mechanical connection between the spoke structure or wheel disk and the rim.

WO13083729 was published in June 2013 in the name of the same applicant. It describes a wheel made out of fiber reinforced material. The wheel comprises an insert in the center of the wheel which is partially embedded in the composite material.

SUMMARY OF THE INVENTION

One object of the present invention is to provide a wheel made at least partially out of a fiber reinforced plastic material which provides an improved load capacity. A further object of the invention is to provide a method to make an according wheel.

From the prior art several wheels made out of composite material are known. These wheels are not having a sufficient load carrying capacity, especially in motor sports application. A wheel according to the invention provides a superior performance and a further weight reduction.

A wheel according to the invention normally comprises a rim and a wheel center with several spokes which are connected to the rim. Several spokes comprise at least one butt strap protruding from a radially outer end of the spokes. The rim comprises openings which correspond to the cross-section of the spokes (preferably contour sharp) and which are arranged corresponding to the at least one butt strap. In a mounted position the at least one butt strap extends across a related opening in the rim. The openings usually are arranged in the region of a rim well and/or an outer bead seat and/or an outer hump and/or an outer shoulder. Preferably the at least one butt strap is arranged at least partially in a circumferential and/or axial direction to the rim where it is bonded to the rim. Normally the at least one butt strap is arranged tangential to the rim and follows the outer contour. Usually the at least one butt strap is at least partially covered on the outside by at least one additional layer of material, e.g. in that composite material is wound onto the outer surface. If required the additional layer of material envelops a reinforcement ring. The wheel center may comprises a wheel flange with an at least partially therein embedded insert. In a preferred embodiment the wheel may comprise a bundle of reinforcing fibers which directly interconnect the wheel rim with the insert. In a variation the bundle of reinforcing fibers starts in the rim continue along a spoke, embraces the insert, continues along a spoke and ends in the rim. The insert may comprise a mouth wherein the bundle of reinforcing fibers crosses the insert. The spokes may comprise an intermediate rib which blends into a rim edge. The intermediate rib may comprise a bundle of reinforcing fibers which continues along the intermediate rib and ends in the rim. The bundle of reinforcing fibers may extend in a loop over the rim edge. At least one rim edge may comprise a circumferential reinforcement ring which is enclosed by composite material of the rim and/or the at least one spoke. The wall thickness of the spokes may increase in the direction of the wheel flange for improved load distribution. Alternatively or in addition the cross section of the spokes may widen in the direction of the rim. The spokes may comprise a funnel-shaped outer section.

A method for producing a wheel according to the invention in principle comprises the following method steps: Providing a rim or a section of a rim which is later covered by at least one layer of additional material. Generating of several openings in the rim distributed in circumferential direction. Good results may be achieved when the openings are made by laser-cutting. Providing of a wheel center comprising several spokes, wherein the spokes comprise a their outer end at least one butt strap. Then lacing the butt strap through the openings. Arranging the butt straps on an outer surface of the rim. For improved load transmission the butt straps are expanded on the surface. Bonding the butt straps on the outer surface. Normally at least one additional layer of material is arranged from the outside on the butt straps encompassing them from the outside. The additional layer of material may form part of at least one outer rim edge. In a variation the additional layer of material encompasses a reinforcement ring as described and shown in the drawings.

In a preferred embodiment the rim and the wheel center are made out of composite materials, preferably carbon fibers and/or KEVLAR aramid fibers and/or glass fibers and/or material fibers, etc. embedded in a matrix material, such as epoxy resin. The matrix may be added by resin transfer molding (RTM) and/or in form of a prepreg where the fibers are already arranged in a matrix which is not yet cured.

Several layers of fibers and/or bundles of fibers can be attached to each other by glue and/or sewing before curing of the matrix occurs. If appropriate the rim may be made out of a different material such as metal.

A wheel according to the invention may be used e.g. for vehicles, such as motorbikes, motorcars, trucks or bicycles. However, it is not limited to these fields of application and may also be used in any other, such as for airplanes.

BRIEF DESCRIPTION OF THE DRAWINGS

The herein described invention will be more fully understood from the detailed description given herein below and the accompanying drawings, which should not be considered as limiting to the invention described in the appended claims.

The drawings are showing.

DETAILED DESCRIPTION OF THE INVENTION

The foregoing summary as well as the following detailed description of the preferred embodiments is better understood when read in conjunction with the appended drawings. For the purposes of illustrating the invention, an embodiment that is presently preferred, in which like numerals represent similar parts throughout the several views of the drawings, it being understood, however, that the invention is not limited to the specific methods and instrumentalities disclosed.

Figure 1:
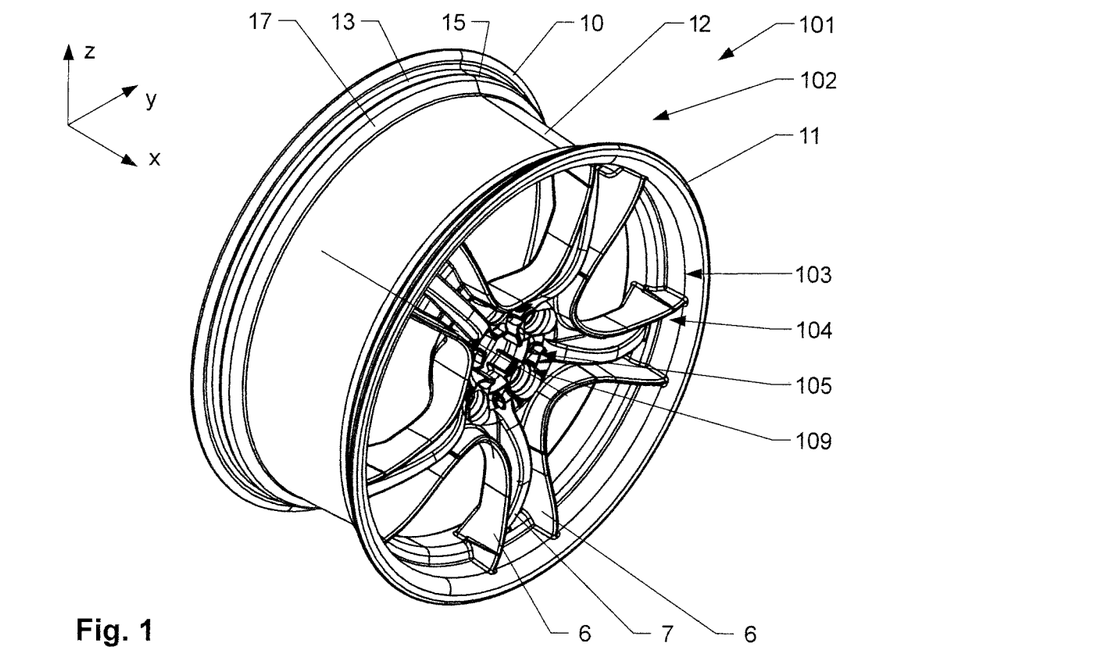
FIG. 1 shows a wheel according to the invention in a perspective view from the front and above.
Figure 2:
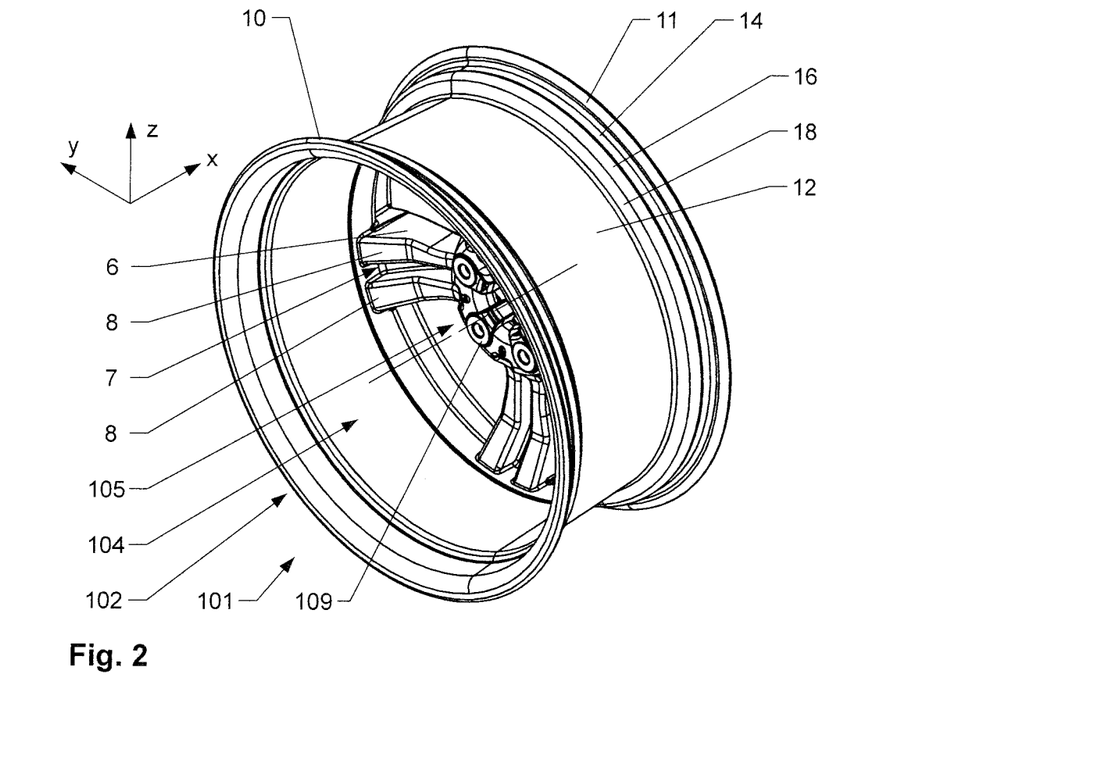
FIG. 2 shows the wheel according to FIG. 1 in a perspective view from the rear and above.

FIG. 1 schematically shows a wheel 101 according to the invention in a perspective view from above and the front. FIG. 2 shows the wheel according to FIG. 1 in a perspective view from above and the rear.

Figure 3:
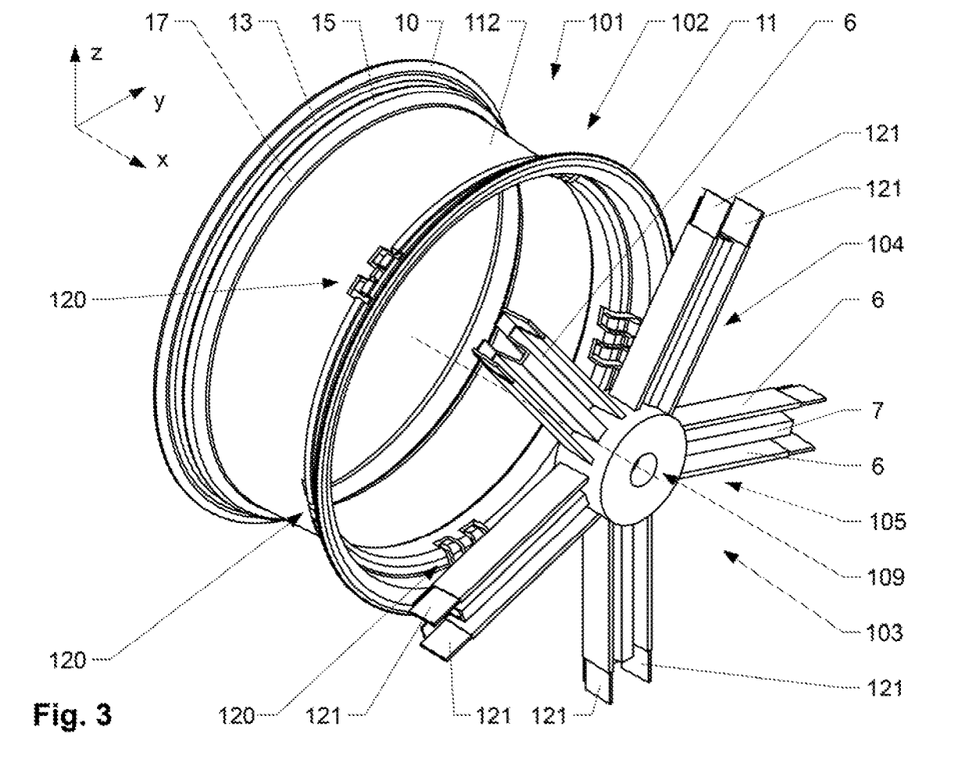
FIG. 3 shows an early step in making of the wheel according to FIG. 1.
Figure 4:
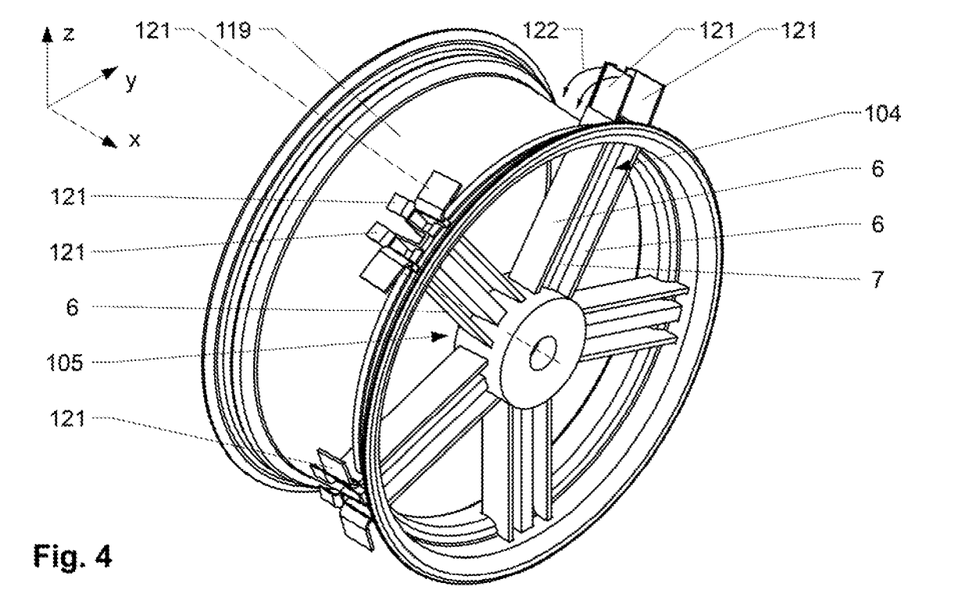
FIG. 4 shows an intermediate step in making of the wheel according to FIG. 1.
Figure 5:
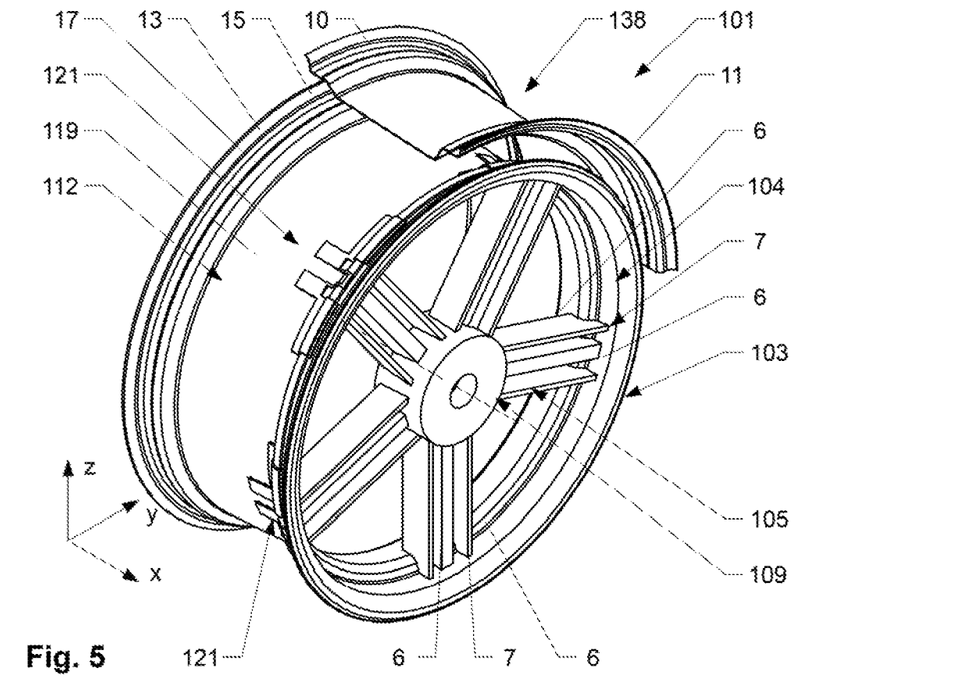
FIG. 5 shows a later step in making of the wheel according to FIG. 1.
Figure 6:
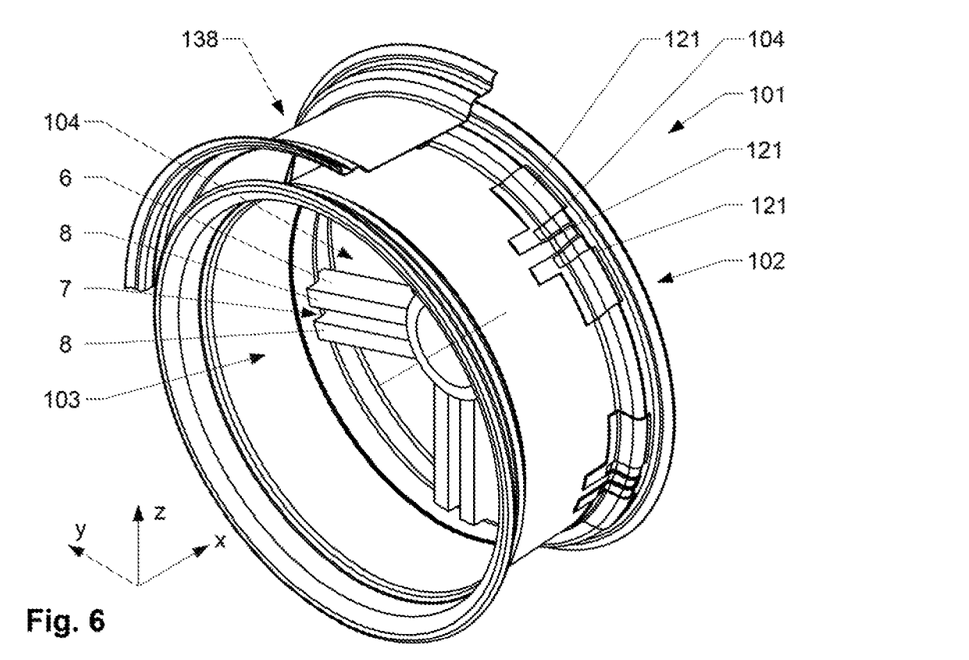
FIG. 6 shows the later step in making of the wheel according to FIG. 1 in a different view.

FIG. 3 shows in a schematic manner an early step in making of a wheel 101. FIG. 4 shows in a schematic manner an intermediate step in making of the wheel 101. FIG. 5 and FIG. 6 show in a schematic manner later steps in making of the wheel 101.

A wheel 101 according to the invention comprises a rim 102 and a wheel center 103 here comprising several spokes 104 interconnecting a wheel flange 105 arranged in the center of the wheel center 103 with the rim 102. The rim 102 and the wheel center 103 are in the shown embodiment made out of composite materials, preferably carbon fibers and/or KEVLAR aramid fibers and/or glass fibers and/or material fibers, etc. embedded in a matrix material, such as epoxy resin. If appropriate the rim 102 may be made out of a different material such as metal.

In the shown embodiment, the rim 102 comprises in a final state of an inner and an outer rim edge 10, 11 between which a rim well 12 extends. Adjacent to the inner and the outer rim edge 10, 11 an inner and an outer bead seat 13, 14 are arranged, which are delimited from the rim well 12 by an inner and an outer hump 15, 16. The difference in level between the smaller diameter of the rim well 12 and the larger diameter of the inner and outer humps 15, 16 is bridged by an inner and an outer shoulder 17, 18.

The spokes 104 are interconnected to the rim 102 in a mechanically advantageous way as will be explained subsequent in a detailed manner.

The spokes 104 of the shown wheel 101 are having an open cross-section, which is accessible from the inside and the outside when viewed in axial direction (x-axis) of the wheel 101 and which is comparably easy to produce. Each spoke 104 comprises two lateral flanges 6 and an intermediate rib 7, which in the shown embodiment per-se has a U-shaped cross-section when cut transversal to the radial direction. The lateral flanges 6 and the intermediate rib 7 are interconnected on the rear side by a cross wall 8 which in the shown embodiment is arranged at the inner end of the lateral flanges 6.

In the shown embodiment the wheel flange 105 comprises an insert 9, e.g. as shown in FIGS. 13 through 16, which is at least partially embedded in the composite material of the wheel center 103.

Figures 9, 10, 11:
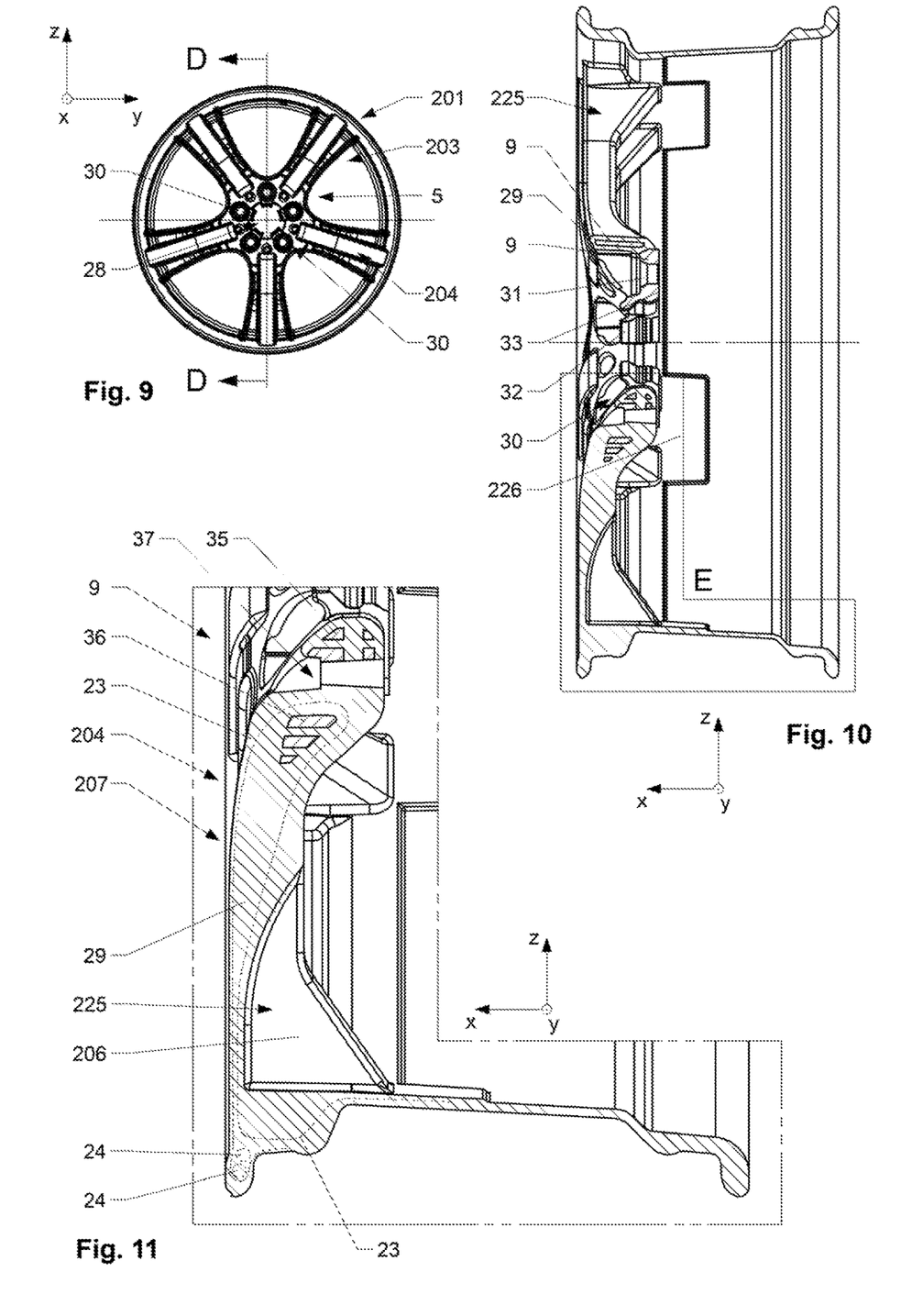
FIG. 9 shows the wheel according to FIG. 7 in a front view.
FIG. 10 shows a section view according to section line DD of FIG. 9.
FIG. 11 shows Detail E according to FIG. 10.

As schematically indicated in FIG. 11 the insert 9 may interact with a certain amount of fibers 29 of the composite material which run from the wheel center 103 in radial direction of a corresponding spoke 104 without interruption into the rim 102. In a preferred embodiment, said fibers are primarily arranged in the intermediate rib 7. Good results are achieved if the fibers at least partially encompass the insert 9 e.g. as shown in the section view of FIG. 11 fibers 29, schematically indicated by dotted line 23 start in the rim 102, run into the spoke 104, encompass a beam 24 of the insert 9, run in opposite direction along the spoke 104 and end in the rim 102.

The making of a wheel 101 according to the invention is now explained in more detail in accordance with the FIGS. 3 through 6.

As can be seen in FIG. 3, in a first phase a rim 102 and a wheel center 103 are provided which are prepared independent from each other. These parts are shown here in an idealistic manner. It should be understood that in the process of assembling the rim 102 and the spokes 104, normally at least the fibers forming the spokes 104 may be in a non-solid and thereby still deformable condition.

In the rim 102 openings 120 are provided which in principle correspond to the layout the (final) cross-section of the spokes 104. The openings 120 extend in a radial direction through the rim 102. Good results may be achieved by sharp contoured laser-cutting of the openings 120 matched to the cross-section of the spokes 104.

In the shown embodiment, the openings 120 are arranged adjacent to the outside of the rim 102 in the area of the rim well 12, the outer bead seat 14, the outer hump 16 and the outer shoulder 18. The openings 120 are foreseen to receive at least one butt strap 121, which protrudes at the outer end of a spoke 104. They may later be covered on the outside by additional layers of material in at least one further process step.

As explained above, the rim 102 and the spokes 104 for the wheel center 103 are preferably prepared independent from each other and then assembled in a further step with respect to each other, whereby the butt straps 121 of the spokes 104 are laced through the openings 120 and folded down (indicated by lines 122) on a surface 119 of the rim 102 as schematically indicated in FIG. 4 by lines 122. The fibers of the butt straps are preferably expanded to obtain best load introduction and exchange of forces between the rim 102 and the wheel center 103. The surface 119 may be covered in a later step, e.g. when additional layers of material are applied as described subsequent. The material forming a radially inner section of the rim 102 is in the present step normally in a cured or in a semi cured state. If appropriate it may act as a tool for forming of the still formable fibers for the spokes 104.

In a further process step the composite material forming the spokes 104 and the butt straps 121 are cured by setting the resin in which the reinforcement fibers are embedded. Furthermore, the insert 9 is embedded in the wheel flange 105. This step normally takes place by inserting the wheel center 103 as well as the insert 9 in a corresponding mold (i.e. forming tool; not shown in detail), closing the mold and initiating the curing process of the matrix. If appropriate, the rim 102 can be also included in the mold or form part of it, e.g. by acting as a wall of the mold.

The fibers later forming the wheel 101 are preferably in the state of a semifinished product when they are assembled as shown in FIG. 4. Alternatively or in addition, the fibers are at least partially in a dry state. The matrix material is then added e.g. by applying a vacuum and/or pressure to the mold.

After sufficiently curing of the matrix of the composite material, the wheel has a shape as indicated in FIGS. 5 and 6. The fibers of the butt straps 121 extend across the rim 12 and then in circumferential direction and/or transversal direction in or along the outer surface 119 of the rim 102. The butt straps 121 are following the outer contour, respectively are firmly integrated in the outer surface 119. The openings 120 are normally completely filled in and are therefore not present anymore. If appropriate, the outer surface 119 can be covered at least partially by additional composite material or another cover. For making of the rim 102 and the wheel center 103 usually two separate tools are used.

In FIGS. 5 and 6 the assembled wheel 101 is shown after curing of the fibers forming the wheel center 103 in perspective views from the front and the rear. As it can be seen, the spokes 104 cross the rim 102 and end into the butt straps 121, which are folded down, expanded and coalesced with the rim 102. As the drawings are only schematic, the shape and the arrangement of the butt straps is only exemplary. The openings 120 are not visible anymore as they are completely filled in by composite material. Normally the butt straps 121 and the area where the spokes 104 cross the rim are covered by additional layers of material which are applied in the same or in a different process step. Good results may be achieved when at least one additional layer 138 of composite material is attached and/or wound in circumferential direction onto the outer surface 119 forming part of the rim 102 thereby at least partially covering the surface 119. Normally the butt straps 121 are not visible in the final product as they are coalesced with the rim 102. The butt straps 121 may overlap in a tangential direction forming circumferential ring segments with each other. The butt straps 121 arranged in axial direction may enlace a reinforcement ring arranged in a rim edge.

Figure 12:
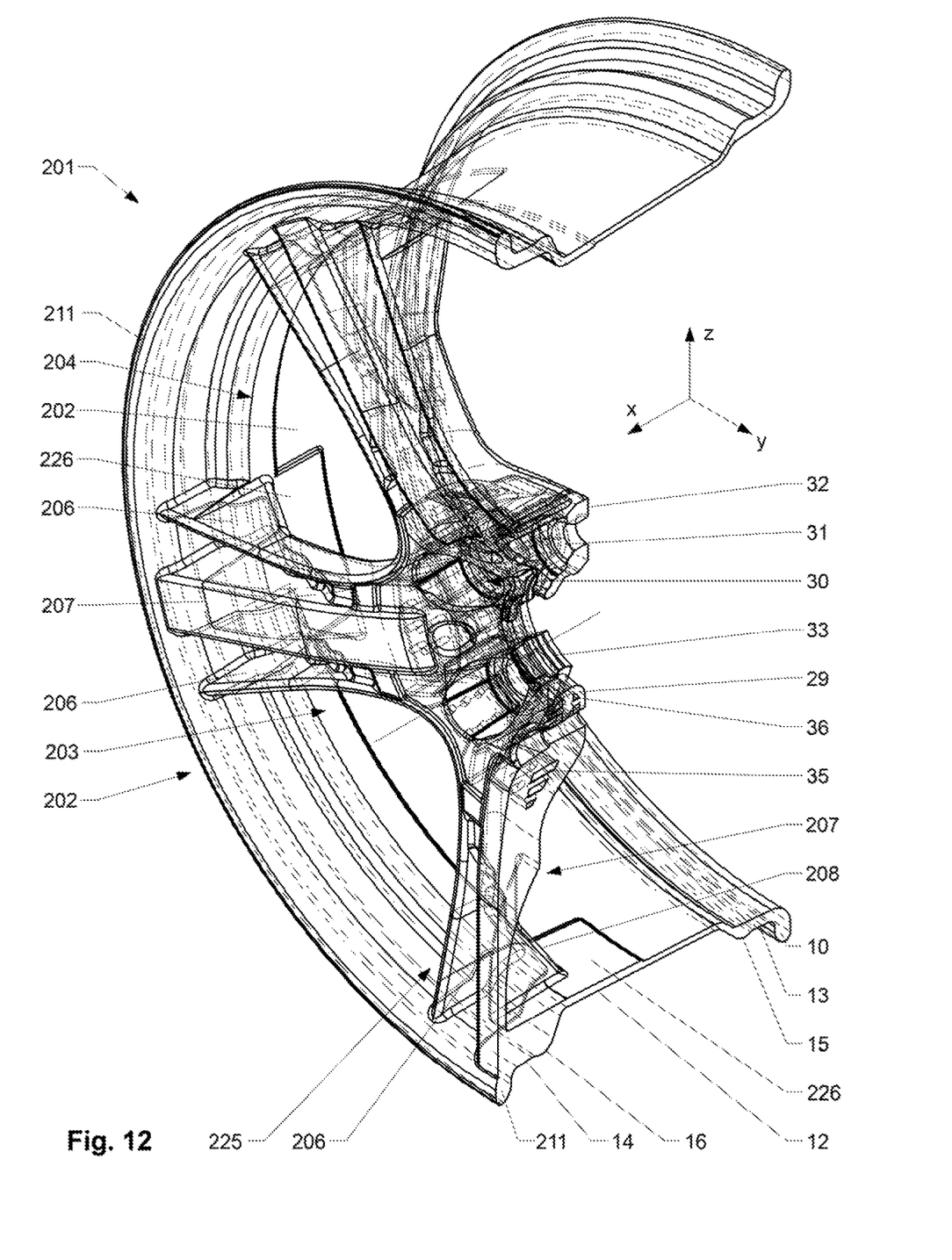
FIG. 12 shows the wheel according to FIG. 7 in a partially cut manner.
Figure 13:
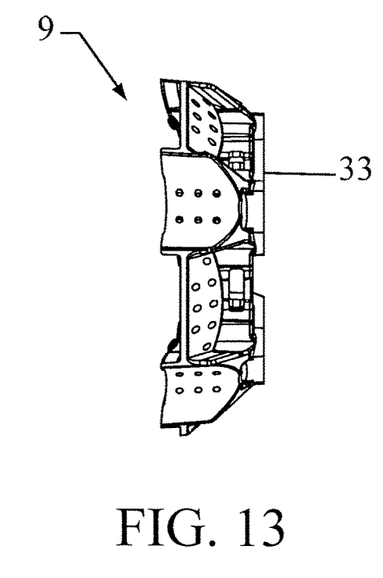
FIG. 13 shows an insert in a side view.
Figure 14:
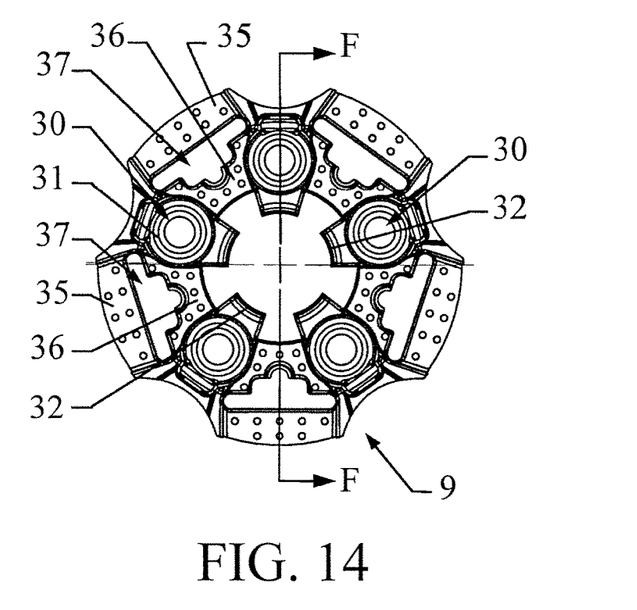
FIG. 14 shows the insert according to FIG. 13 in a front view.
Figure 15:
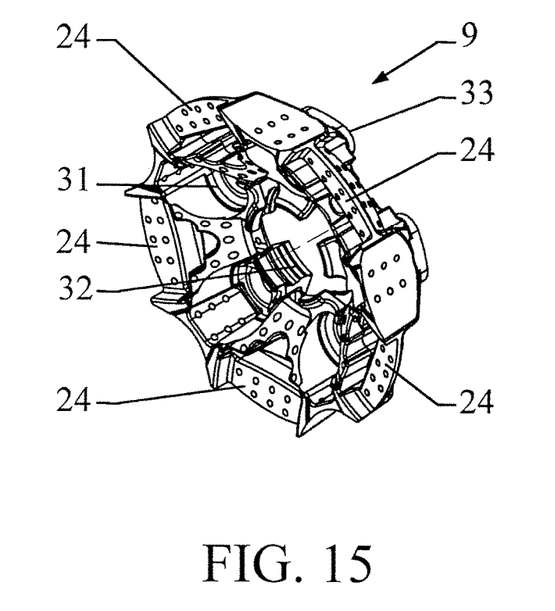
FIG. 15 shows the insert in a perspective view.
Figure 16:
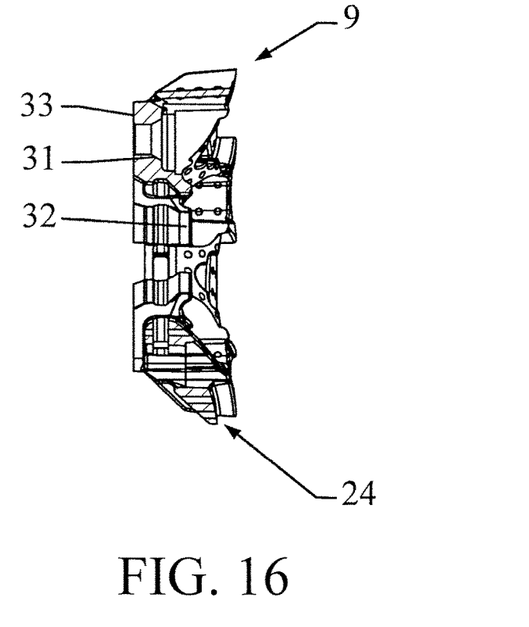
FIG. 16 shows a section view of the insert along section line FF of FIG. 14.

FIGS. 7 through 12 are showing a further embodiment of a wheel 201 according to the invention. With respect to the general description and the manufacturing process it is referred to the elaborations made above. FIG. 9 shows a front view of the wheel 201 according to FIGS. 7 and 8. FIG. 10 shows a section view along section line DD according to FIG. 9. FIG. 11 shows Detail E according to FIG. 10 in a magnified manner. FIG. 12 shows the wheel 201 according to FIGS. 7 through 11 in a partially cut manner and with hidden lines displayed as dashed lines. FIGS. 13 through 16 are showing an insert 9 as embedded in the wheel 201 according to FIGS. 7 through 12.

Compared to the embodiment as shown in FIGS. 1 and 2, the shown variation comprises a different interconnection between the rim 202 and the spokes 204 of the wheel center 203. As well visible in FIG. 7, the intermediate rib 207 merges very close to the front of the outer rim edge 211 and (in a sectional view) almost tangential into the outer rim edge 211. This offers an advantageous arrangement of the fibers in this area and therefore an improved load application and distribution at very high load levels.

Figure 7:
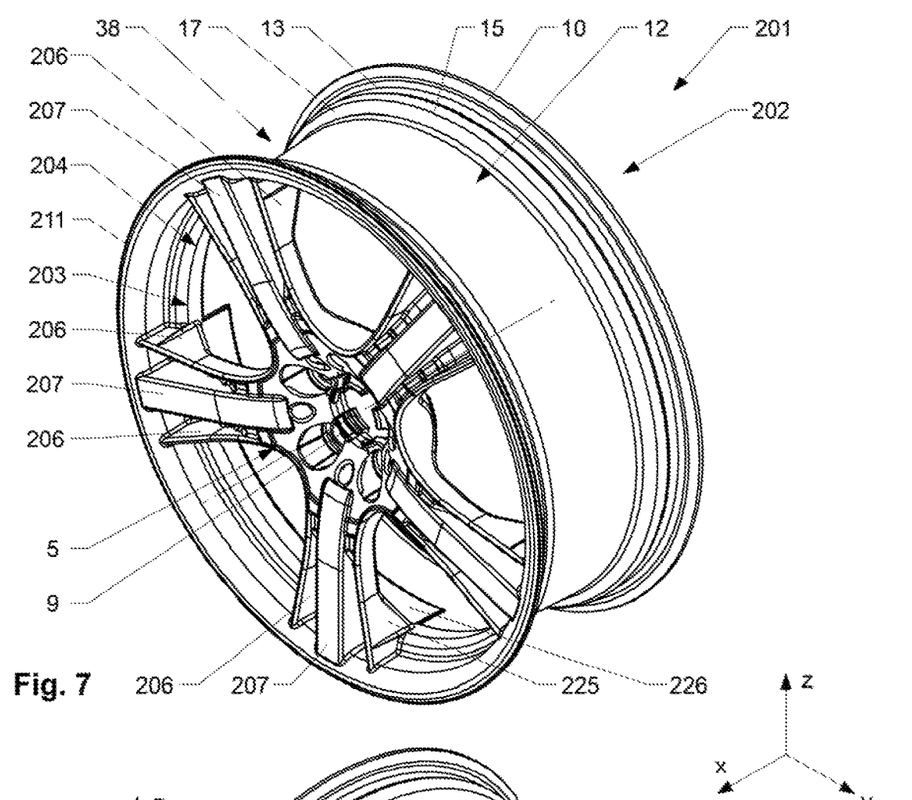
FIG. 7 shows a further embodiment in a perspective front view.
Figure 8:
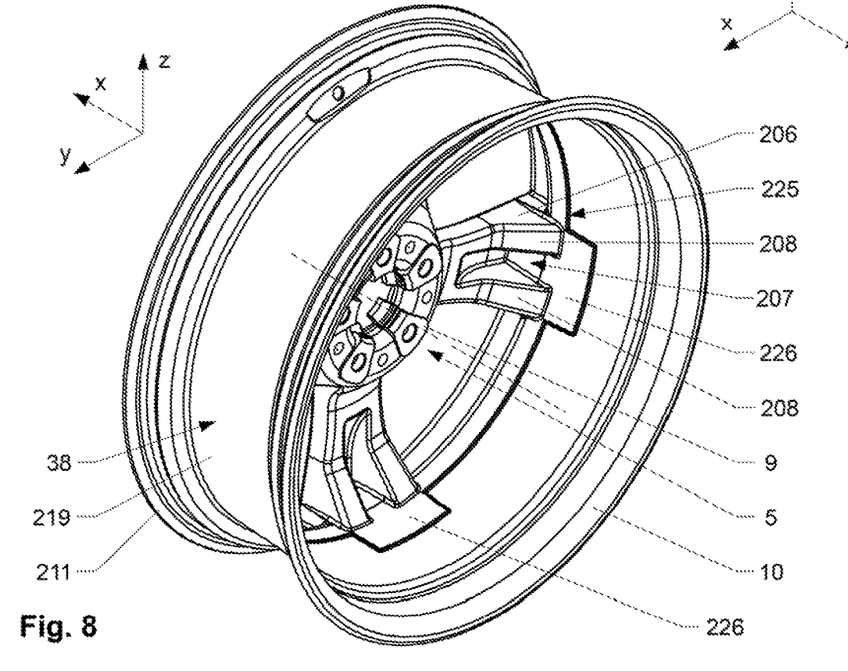
FIG. 8 shows the wheel according to FIG. 7 in a perspective rear view.

As visible in FIGS. 7 and 8, the cross-section of the spokes 204 widens in a radially outward direction of the rim 292 and opens-up into an outer section 225 which is funnel-shaped and then merges into the rim 202. Thereby the wall thickness of the lateral flanges 206 the intermediate rib 207 and the cross wall 208 reduces. As visible in the detailed section view according to FIG. 11, wall thickness of the intermediate rib 207 increases significantly in the direction of the wheel center by a factor. Depending on the field of application and the design the factor is normally in the range of 2 to 10 when comparing the thinnest to the thickest wall area.

The rim 202 comprises thickenings 226 arranged on the inside, which act as local reinforcements in the area where the spokes 204 are connected to the rim 202. On the outside, the butt straps 221 are not visible as they are fully integrated into the outer surface 219 of the rim.

In FIGS. 13 through 16, an embodiment of an insert 9 is shown, which after the production of a wheel as described above, is mounted in the wheel center 203 forming part of the wheel flange 5. The insert 9 forms the main connection between the wheel 201 and a hub of a car (not shown in detail). Due to the special design and arrangement of the insert 9 in the composite material forming the wheel center 203, direct contact of the composite material and the hub of a car can be prevented. The herein shown insert 9 is an improvement over the insert as described in the international patent application published under WO2013/083729 in the name of the same applicant. The insert 9 comprises fastening holes 30 to attach the insert to a hub of a car. Furthermore, the insert comprises several contact areas 31, 32, 33 which protrude above the composite material as e.g. shown in FIG. 10 when in a mounted position and by which the insert 9 (respectively the wheel 201) is in primary contact with the hub of a car (both not shown). The first contact areas 31 are arranged in the fastening holes 30 acting as support for the fastening nuts (not shown). The second contact areas 32 are arranged at the inside forming a contact area between the hub of a car (both not shown) and the insert 9. The third contact areas 33 are arranged in a center opening 28 of the wheel 21 and act as radial support of the wheel 201 with respect to the hub. The first and the third contact areas of the shown embodiment are, with respect to the circumferential direction, aligned with respect to each other. Bridges 34 are arranged between the fastening holes 30. Although the general principle is similar, a difference exists with respect to the design of the bridges 34, which in the shown variation comprise an upper part 35 and a lower part 36 and a mouth 37 in between through which fibers of the composite material can be strapped. As e.g. shown in FIG. 11 at least one bundle of fibers 29 (schematically indicated by dotted line 23) passes across the mouth 37 preferably start in the rim 202 continue along the in- or the outside of a spoke 204, pass through the mouth 37, continue again along the spoke 204 on an opposite side and end in the rim 202 again. As indicated in FIG. 11 the outer rim edge 211 may comprise a reinforcement ring 24, e.g. in the form of unidirectional fibers or an other appropriate material such as metal.

What is claimed is:

1. A wheel comprising:
a rim and a wheel center with spokes with at least one butt strap protruding from a radially outer end of the spokes, wherein the rim comprises at least one opening through the rim and arranged corresponding to the at least one butt strap and wherein the at least one butt strap extends across a related at least one opening in the rim.

2. The wheel according to claim 1, wherein the at least one opening is arranged in the region of the rim well and/or the outer bead seat and/or the outer hump and/or the outer shoulder.

3. The wheel according to claim 1, wherein the at least one butt strap is arranged at least partially in a circumferential and/or axial direction to the rim.

4. The wheel according to claim 1, wherein the at least one butt strap is arranged tangential to the rim.

5. The wheel according to claim 1, wherein an outer surface of the rim and the at least one butt strap are at least partially covered by at least one additional layer.

6. The wheel according to claim 5, wherein the additional layer envelops a reinforcement ring.

7. The wheel according to claim 1, wherein the wheel center comprises a wheel flange with an insert embedded at least partially in the wheel center.

8. The wheel according to claim 7, wherein the wheel comprises a bundle of reinforcing fibers which directly interconnect the wheel rim with the insert.

9. The wheel according to claim 8, wherein the bundle of reinforcing fibers start in the rim continue along a spoke, embrace the insert at least partially continue along a spoke, and end in the rim.

10. The wheel according to claim 8, wherein the insert comprises a mouth and the bundle of reinforcing fibers crosses the mouth.

11. The wheel according to claim 1, wherein the spokes comprise an intermediate rib.

12. The wheel according to claim 11, wherein the intermediate rib blends into a rim edge.

13. The wheel according to claim 12, wherein the intermediate rib comprises a bundle of reinforcing fibers which extend along the intermediate rib and end in the rim.

14. The wheel according to claim 13, wherein the bundle of reinforcing fibers extends in a loop over the rim edge.

15. The wheel according to claim 1, wherein at least one rim edge comprises a circumferential reinforcement ring which is enclosed by composite material of the rim and/or at least one spoke.

16. The wheel according to claim 1, wherein the wall thickness of the spokes increases in the direction of the wheel flange.

17. The wheel according to claim 1, wherein the cross section of the spokes widens in the direction of the rim.

18. A method for producing a wheel comprising the following method steps:
a) providing a rim;
b) generating openings through the rim in a circumferential direction;
c) providing a wheel center comprising spokes comprising at each respective outer end at least one butt strap;
d) lacing the butt strap through the openings;
e) arranging the butt straps on an outer surface of the rim;
f) bonding the butt straps on the outer surface.

19. The method according to claim 18, wherein at least one additional layer of material is arranged on the butt straps.

20. The method according to claim 18, wherein the additional layer of material forms part of at least one outer rim edge.

21. The method according to claim 18, wherein the additional layer of material encompasses a reinforcement ring.

* * * * *